June 4, 1935.  H. E. BUCKLEN ET AL  2,003,823
SHOCK ABSORBER
Filed Dec. 12, 1930  3 Sheets-Sheet 2
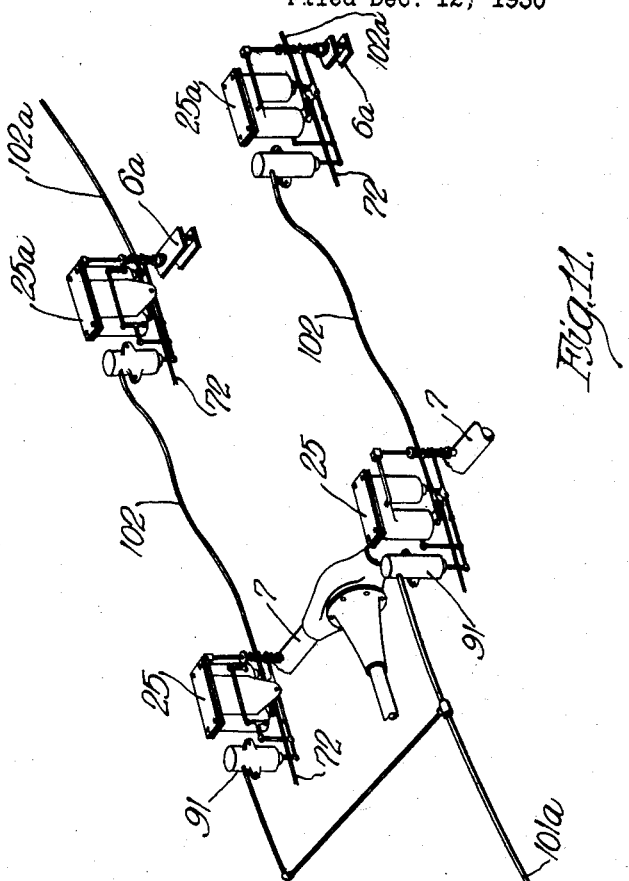
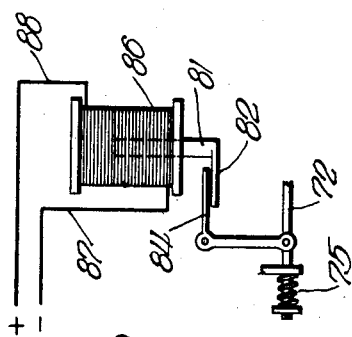
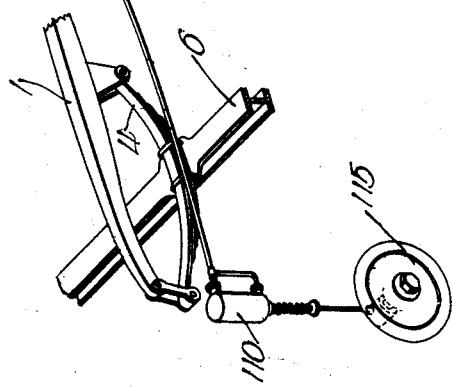
Inventors:
Herbert E. Bucklen
Joseph N. Mahoney
By *Attys.*

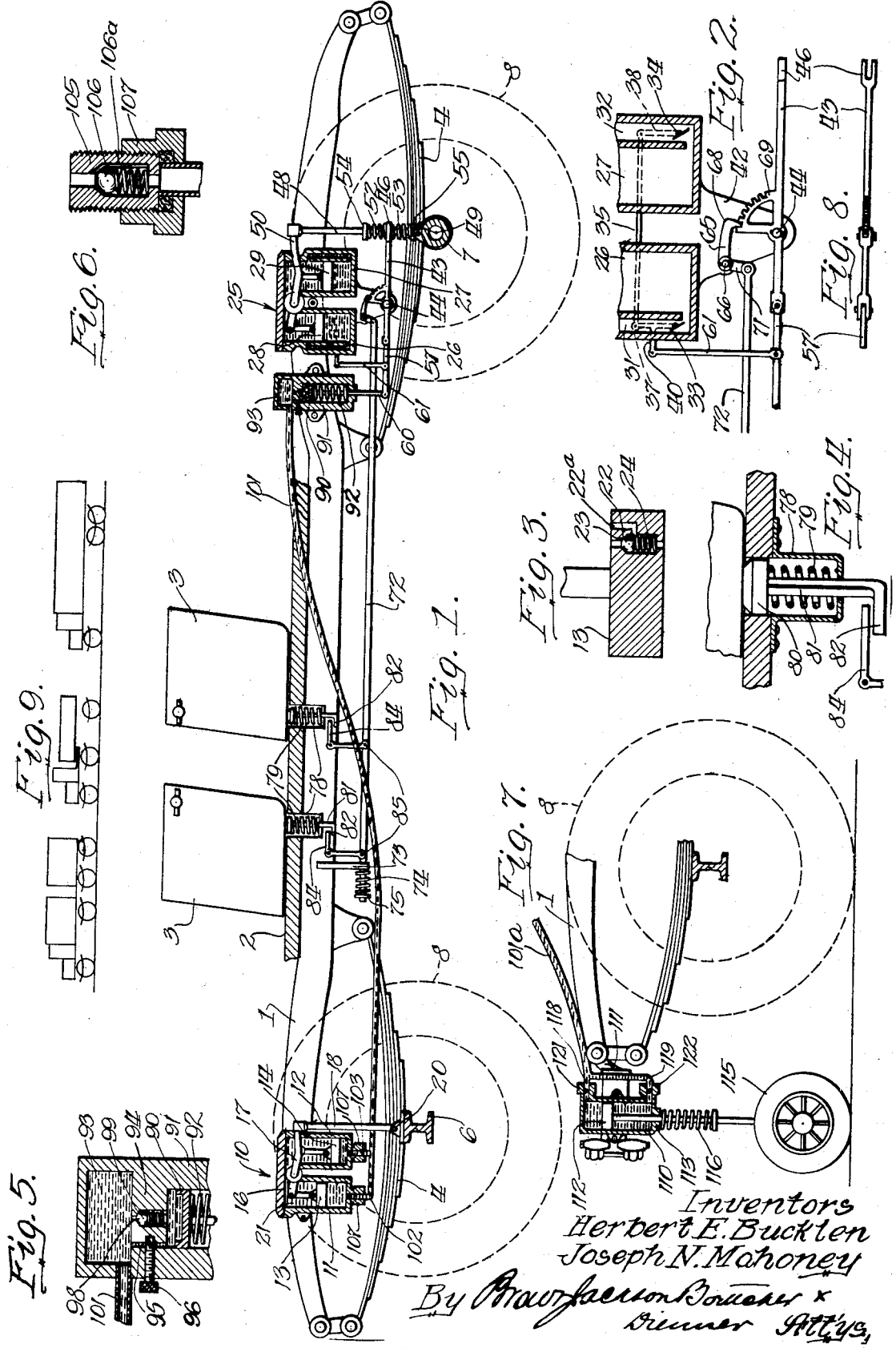

June 4, 1935. H. E. BUCKLEN ET AL 2,003,823
SHOCK ABSORBER
Filed Dec. 12, 1930 3 Sheets-Sheet 3
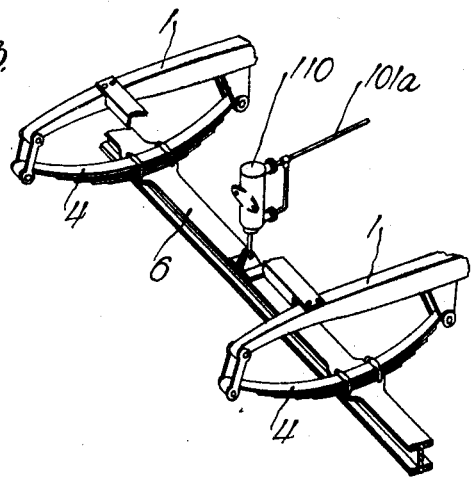
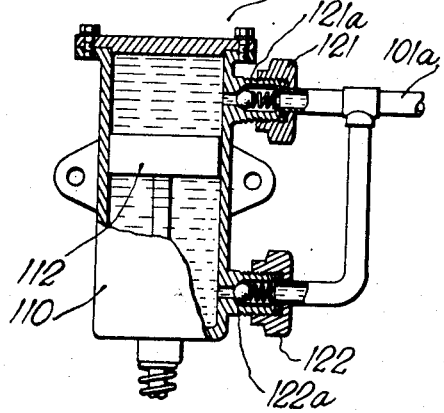
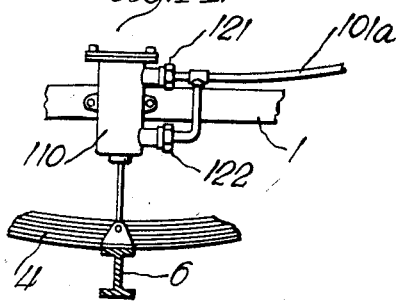
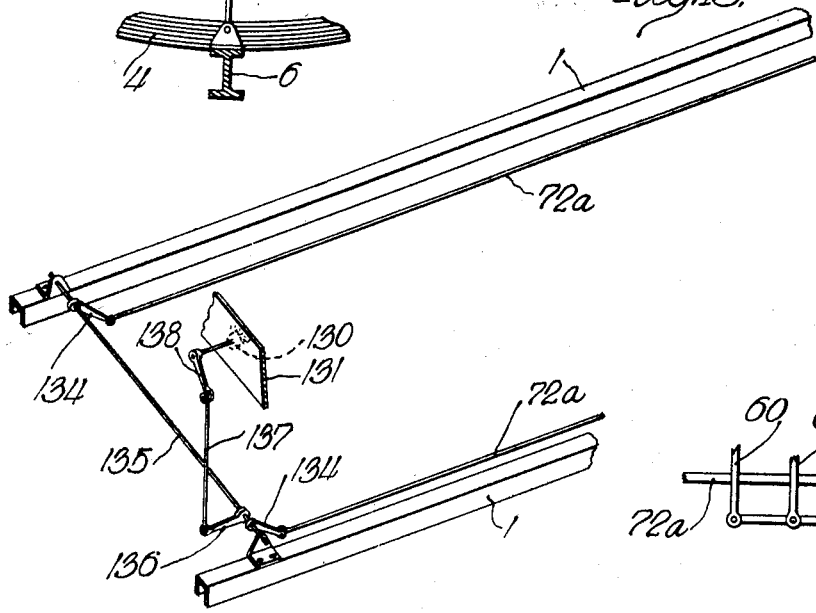
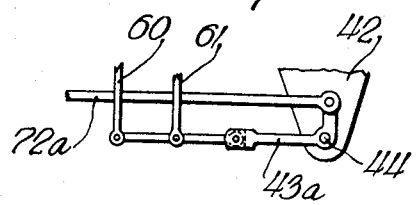
Inventors:
Herbert E. Bucklen
Joseph N. Mahoney
By [signature]
Att'ys.

Patented June 4, 1935

2,003,823

UNITED STATES PATENT OFFICE 2,003,823

SHOCK ABSORBER

Herbert E. Bucklen, Elkhart, Ind., and Joseph N. Mahoney, Brooklyn, N. Y.

Application December 12, 1930, Serial No. 501,806

30 Claims. (Cl. 188—88)

The present invention relates to shock absorbers for damping oscillations or vibrations produced between two relatively movable members subjected to varying forces. More particularly, the present invention is concerned with a new and improved method and means for controlling shock absorbers for vehicles. The principal object of the present invention is to provide means for automatically adjusting the degree of resistance established by a shock absorber in proportion to the varying static load. Another object of the present invention is to provide means for automatically and continually adjusting the degree of resistance established by the shock absorber in accordance with the dynamic load, that is, the load imposed upon the vehicle resulting from variations in load, speed, and other conditions, particularly while the vehicle is in motion.

Prior to our invention, shock absorbers for vehicles, particularly automobiles, have been constructed with a fixed adjustment which could be manually operated to vary the resistance to be established by the shock absorber to meet variable loads and other conditions, only while the vehicle was standing. So far as we are aware, such manual adjustment has not, prior to our invention, been made or arranged to be even approximately adjusted for the rapidly varying load and speed conditions of a vehicle while in rapid motion.

Other objects and advantages of the present invention will be apparent to those skilled in the art after a consideration of the following detailed description of the preferred structural embodiment, taken in conjunction with the accompanying drawings, in which:

Figure 1 illustrates the application of our invention to an automobile provided with the usual spring suspension, and shows the provision of front and rear shock absorbers together with means for controlling the rear shock absorbers in accordance with the static and dynamic loads to which the spring suspension and the rear shock absorbers are subjected;

Figure 2 is an enlarged cross section showing in greater detail the means for adjusting one of the rear shock absorbers in accordance with the static load on the vehicle;

Figure 3 is an enlarged cross section through one of the pistons of the shock absorber, the pistons in the front and rear shock absorbers being substantially identical;

Figure 4 is an enlarged detail view of a portion of the operating mechanism for the adjusting means operable to vary the resistance or reaction of the rear shock absorber in accordance with the static load;

Figure 5 is an enlarged cross section of the pressure chamber associated with the rear shock absorber and operative to also adjust the variable resistance or reactance thereof;

Figure 6 is an enlarged detail view showing the connection between the front shock absorber chambers and the fluid pressure line communicating with the chamber shown in Figure 5;

Figure 7 is a modified form of pressure device for controlling the rear shock absorber in accordance with the road conditions;

Figure 8 is a top view of one of the operating levers for the static load adjusting means;

Figure 9 shows other types of vehicles to which the present invention is applicable;

Figure 10 shows an electrical means for adjusting the shock absorber resistance in accordance with the static load;

Figure 11 is a schematic view illustrating the serial relation between a plurality of shock absorbers arranged for automatic progressive adjustment;

Figure 12 is an enlarged view of the pressure cylinder shown in Figure 7;

Figures 13 and 14 show modifications of the structure shown in Figure 7; and

Figures 15 and 16 show one form of manual control for the shock absorbers.

Referring now more particularly to Figure 1, the reference numeral 1 indicates the frame of a vehicle carrying a body or load supporting means 2 having doors 3, exemplifying operating means, for obtaining access to the body 2, and spring suspension means 4 for supporting the body 2 on the front axle 6 and the rear axle 7 which are provided with the usual supporting wheels 8.

The front shock absorber is illustrated in its entirety by the reference numeral 10 and, as will be clear from Figure 1, the same comprises a pair of hydraulic cylinders 11 and 12, in which a pair of pistons 13 and 14 are operatively mounted. The pistons 13 and 14 are connected to opposite ends of a rocking lever 16 journaled in the housing forming the cylinders 11 and 12 and connected by means of an arm 17 and a link 18 to the front axle 6. The cylinders 11 and 12 are securely connected with the frame 1 to move therewith, while the lower end of the link 18 is connected, by means of a bracket 20, to move with the front axle 6.

Each of the cylinders 11 and 12 is filled above and below the pistons 13 and 14 with a fluid 21 forming the resistance medium for the front shock absorber. As more clearly illustrated in Figure 3 the piston 13, as well as the other pistons, both of the front shock absorber and the rear shock absorber, is provided with a ball or check valve 22 pressed against a seat 23 in the piston 13 by means of a spring 24. When the piston is moved upwardly in its associated cylinder the liquid pressure is exerted downwardly against the ball 22 to open the same against the relatively light resistance of the spring 24 which opens the passage through the piston and thus allows the fluid in that cylinder to pass into the lower part thereof. When the piston 13 moves downwardly in the cylinder the pressure of the spring 24, together with the pressure of the liquid confined between the piston 13 and the lower end of the associated cylinder 11, causes the ball 22 to remain seated in leak tight relation against the seat 23.

The ball 22 may be arranged, or other means may be provided, if desired, for allowing the liquid underneath the piston 13 to pass through a restriction, such as a small duct or leakage port 22a (see Figure 3), to the upper part of cylinder 11. The reaction developed by such restriction is effective, as will be understood, to retard or dampen the vibration of the frame 1 with respect to the axle 6.

The front shock absorber 10, as shown in Figure 1, is more or less illustrative of the conventional two-way hydraulic shock absorber and is seen to include two cylinders and two associated pistons thereby providing a means for resisting both the upward and downward oscillation or vibration of the frame 1 with respect to the supporting axle 6.

The rear shock absorber is designated in its entirety by the reference numeral 25 and, like the front shock absorber 10, is seen to comprise a pair of cylinders 26 and 27 containing a fluid resistance medium, together with the pistons 28 and 29 associated therewith and which operate in a manner similar to that described for the front shock absorber. While we have shown only one front and one rear shock absorber, it is to be understood that there is one shock absorber unit for each wheel, as is the usual practice. The housing forming the cylinders 26 and 27 is secured to the rear of the frame 1 and each of the cylinders is provided with a by-pass 31 and 32 (see Figure 2) operative to conduct the fluid resistance medium from one side of the piston therein to the other.

Valve means 33 and 34 are associated with the by-pass 31 and the by-pass 32 and serve as means for restricting the flow of the fluid from one end of the cylinder to the other. This restriction is, in operation, sufficient to establish a resistance opposing the oscillation or vibration of the rear end of the frame with respect to its supporting axle 7, as is well known in the art, whereby shocks due to road inequalities and other conditions are absorbed.

Valves 33 and 34 are connected to be concurrently operated by means of a connecting link 35 and levers 37 and 38, as best shown in Figure 2. Lever 37 is in the form of a bell crank having a laterally extending arm 40 by which the valves 33 and 34 may both be adjusted to control the amount of resistance set up by the rear shock absorber 25. Obviously, rocking the lever 37 in one direction will move the valves 33 and 34 toward their closed position, establishing thereby a greater resistance to the flow of the resistance medium and hence to movement of the pistons 28 and 29, and rocking the bell crank lever 37 in the other direction will open the valves 33 and 34, thereby decreasing the resistance of the shock absorber 25.

It is well recognized in the shock absorber art that this resistance should be varied according to a number of factors, among which may be mentioned the static load of the vehicle, that is, the weight of the load carried, and the dynamic load or, in other words, the intensity and frequency of the forces imposed on the supporting springs and the shock absorber while the vehicle is moving. In accordance with our present invention we provide automatic means, that is, means made effective without any particular attention on the part of the operator, for adjusting the valves 33 and 34 in accordance with a plurality of these varying conditions.

For controlling the adjustment or resistance of the shock absorber in accordance with the static load we provide a lug 42 on the lower part of the housing forming a part of the cylinders 26 and 27, and a lever 43 is pivoted, by means of a pivot pin 44, on the lug 42. One end of the lever 43 is forked, as at 46, and this end is adapted to embrace the connecting link 48 which is pin-connected, as at 49, to the rear axle 7 and operable to swing the arm 50 to actuate the pistons 28 and 29 in the rear shock absorber 25. The lever 43 is not directly connected to the link 48, but is connected thereto by yielding means in the form of a pair of springs 52 and 53, the former being mounted between the forked end 46 and an upper abutment member 54 fixed to the link 48 while the other spring is positioned between the forked end 46 of a lower abutment 55 on the link 48. The springs establish a means for causing the lever 43 to move with the rear axle 7 unless the lever is constrained to move with the body or frame 1 of the vehicle, in which case the springs 52 and 53 yield sufficiently to permit relative movement between the end 46 of the lever 43 and the link 48. Springs 52 and 53 are, however, instantly available as soon as the locking connection between the lever 43 and the body or frame is released.

The end of the lever 43 opposite the forked end 46 is pivotally connected to a lever 57 at one end thereof, the lever 57 being connected at its other end to a movable piston rod 60, later to be described in detail, while its intermediate portion is pivotally connected to a vertically extending link 61 pivoted at its upper end to the laterally extending arm 40 on the bell crank 37 controlling the valves 33 and 34. Since the shock absorber housing for the rear shock absorber 25 is secured to the frame 1 while the link 48 is connected at its lower end to the rear axle 7 it will be seen that the normal tendency of the lever 43 is to be rocked about the pivot axis 44 whenever the rear axle approaches the frame 1. It will thus be clear that when the vehicle is loaded the rear springs 4 yield in proportion to the load, which yielding allows the rear axle 7 to approach the frame 1. This relative motion causes the rear shock absorbing housing and the lug 42 to move downwardly with respect to the rear axle 7. The spring 53 therefore acts upon the forked end 46 of the lever 43 and tends to move the lever 43 in a counterclockwise direction as viewed in Figure 1. Assuming that the lever 43 is unlatched, as will be described later, so that its movement is permitted, the spring 53 swings the rear end 46 of the lever 43 upwardly relative to its pivot 44 as the vehicle frame lowers under the weight of the load and as a result, the forward end of the lever 43 opposite the forked end 46 which, in turn, swings the lever 57 about the piston rod 60 as a fulcrum and exerting a downward pull on the link 61, the rod 60 being loose enough in its cylinder to provide the necessary lateral movement of the lever 57 as the lever 43 rocks about its pivot axis. This causes the bell crank 37 to turn the valves 33 and 34 toward their closed position and thus establishing a greater restriction to the flow of fluid through the by-pass 31 and the by-pass 32, thus adjusting the shock absorber 25 to oppose with a greater force the vertical oscillations of the frame 1 relative to the rear axle 7.

In order to maintain the valves 33 and 34 in their adjusted position, to which they have been moved in accordance with the load applied or static load, as just described, we provide a latch or locking means for fixing the lever 43 relative to the supporting lug 42 after the vehicle has been loaded in order to prevent swinging of the lever 43 during the travel of the vehicle. Preferably, we arrange this latching or locking means in such a manner that it is operated by a part or member of the vehicle which is normally moved during the operation of loading or unloading of the contents of the vehicle, thus making this particular adjustment practically automatic. For example, Figure 1 shows doors 3, which may be the doors providing access to the driver's compartment or which may represent the doors leading to the passenger or freight compartment if the vehicle is employed for such service. The doors 3 are so arranged that when they are opened the latch or lock associated with the lever 43 is released, thereby allowing the valves 33 and 34 to be automatically and immediately positioned according to the amount of load placed on or remaining on the vehicle.

Turning now to the specific locking mechanism, a pawl 65 is provided with a pivot support 66 on the lug 42. The pawl 65 is also provided with an engaging tooth 68 adapted to engage one of the teeth formed on the segment 69 secured to or a part of the lever 43. An operating arm 71 is provided to control the position of the pawl 65 and is rigidly connected therewith, and to this operating arm 71 a link 72 is connected and which extends forward of the vehicle to a point adjacent to or underneath one or more of the doors 3. The forward end of the link or rod 72 is supported in a bracket 73 secured to the frame in any desired manner, and the rod 72 is biased toward its forward or pawl-engaging position by means of a spring 74 tensioned between the abutment 75 at the forward end of the rod 72 and the bracket 73. Thus, unless positively disengaged, the pawl 65 is at all times operative to lock or fix the lever 43 relative to the lug 42 and the rear shock absorber housing.

In order to automatically cause the disengagement of the pawl 65 when the vehicle is being loaded so as to adjust the valves 33 and 34 in accordance with the static load we provide each of the doors 3 with a release mechanism. Located in the body 2 and extending down into or adjacent the frame 1 under each of the doors 3 is a chamber or recess 78 receiving an actuating spring 79 biased between the bottom of the chamber 78 and the tapered head 80 formed on the upper end of a lift rod 81. The rod 81 has a lateral or operating finger 82 thereon. A crank 84 is pivoted to the frame 1 and is provided with a horizontal arm overlying the operating finger 82 and a vertical arm extending downwardly toward and having a forked end 85 embracing and pivotally connected to the rod 72.

As soon as either one of the doors 3 is opened the spring 79 forces the lift rod 81 upwardly and, by virtue of the engagement of the finger 82 with the horizontal arm of the crank 84, the rod 72 experiences a rearward movement which rocks the operating arm 71 and releases the pawl 65 from engagement with the toothed segment 69 on the lever 43. In order to accomplish this result the spring 79 is stronger or under greater tension than the spring 74. As soon as rearward movement of the rod 72 releases the pawl 65 the springs 52 and 53 are operative to swing the lever 43 to a normal position in accordance with the compression of the supporting springs 4 under the static load on the vehicle, as described above. At all other times when the lever 43 is fixed to the lug 42, up and down movement of the frame 1 relative to the rear axle 7 causes the forked end 46 to move up and down along the connecting link 48 compressing in turn the springs 52 and 53. These springs therefore form resilient means for yieldingly causing the lever 43 to adjust the valves 33 and 34 in accordance with the static load on the vehicle. Closing the doors 3 depresses the rods 81 and allows the spring 74 to engage the pawl 65 with the sector 69.

It is to be understood, of course, that the pawl or latch releasing means, the rod 81 and associated structure, may be arranged to be actuated by operating members on the vehicle other than the doors 3. For example, suitable mechanical or electrical operating connections acting between the open or closed position of parts other than the doors of the vehicle, or the on or off position of the vehicle brakes, or other parts, to permit the automatically adjusting of the shock absorber resistance to meet the new load conditions while the vehicle is stationary and operable automatically to lock this particular adjustment and prevent its operation while the vehicle is in motion.

Figure 10 illustrates, more or less diagrammatically, one form of electrical operating means for the latch 65. Instead of a spring 79, the lift rod is provided with a plunger movable upwardly in a solenoid 86 or the equivalent. The solenoid 86 is adapted to be energized by electrical leads 87 and 88 connected with some part of the electrical system of the vehicle, as, for example, the starting motor, in which case the operation of starting the motor temporarily energizes the solenoid 86 and automatically shifts the rod 72 against the tension of the spring 75 to permit the lever 43 to adjust the valves 33 and 34 to the proper position according to the load on the vehicle. It is to be understood that the illustrated electrical means is representative of any electrical or other means on the vehicle subject to periodic or occasional actuation.

Preferably, and as shown in the drawings, the above described adjustment for static load is made only when the vehicle is stationary because according to the present development of transportation it is not usually practical to add or decrease the load while the vehicle is in motion. It is to be noted, however, that when or if such a method of loading or unloading becomes possible our present invention is applicable to such a situation. If, for example, while the vehicle is in motion one of the doors 3 is opened, the pawl 65 is caused to rock upwardly and release the segment 69 from locked engagement with respect to the supporting lug 42. Thus, if the load on the vehicle has been increased or decreased the lever 43 will be positioned according to the depression of the springs 4 under the remaining load. This, of course, assumes that the vehicle is not at this particular instance traversing a rough or uneven road or pavement which might set up vibrations or oscillations of the frame 1 relative to the rear axle 7 and thereby preventing the lever 43 from being adjusted according to the depression of the springs 4 an amount directly proportionate to the static load on the vehicle. If such vibrations were present the adjustment of the lever 43, latched or locked by the subsequent closing of the door 3 which was opened, will of course be modified by the bouncing of the axle 7 relative to the frame 1.

The second condition for which we provide automatic adjustment of the shock absorbers is the varying road or other conditions to which the spring suspension is subjected when the vehicle is in motion or in other words, the dynamic load on the vehicle. For effecting this adjustment we provide means for adjusting the valves 33 and 34 establishing or controlling the permissible reaction to be developed by the shock absorbers. The end of the lever 57 opposite the end which is connected to the lever 43 is pivoted to the piston rod 60 which carries at its upper end the piston 90 movably mounted in a cylindrical housing 91 secured in any manner desired to the frame 1. A spring 92 confined between the lower end of the cylindrical housing 91 and the movable piston 90 biases the piston 90 toward its upward position. As best shown in Figure 5, the upper end of the cylindrical housing 91 is formed to provide a pressure chamber 93 separated from the cylinder in which the piston 90 is movable by means of a wall 94 having, at 95, a restricted communication with the chamber 93. To adjust the amount of restriction a needle valve 96 or any other equivalent means is provided. Communication between the piston cylinder and the chamber 93 is also had by means of a valved passage 98 including a check valve 99 biased toward a position shutting off flow of fluid from the piston cylinder towards the chamber 93.

The chamber 93 is in communication with a conduit or tubing 101 which extends forwardly and is divided into two branches 102 and 103 which respectively communicate with the cylinders 11 and 12 of the front shock absorber 10 by means of a check valve structure shown in detail in Figure 6.

This check valve structure is more or less conventional and includes a nipple 105, a spring pressed ball 106, and a bushing 107 threadedly received by and securing the conduit 101 in leak tight relation to the nipple 105. The nipples 105 of these check valves are threaded, respectively, into the cylinders 11 and 12.

The structure just described is capable of effecting a continual and automatic adjustment of the valves 33 and 34 of the rear shock absorber 25 in accordance with the road conditions, which adjustment is, due to the forward spaced relation of the front shock absorber 10, is made just prior to the instant at which the rear shock absorber is subjected to such road conditions. For example, when the front wheels of the vehicle encounter a rough or uneven spot the front axle 6 will vibrate or oscillate with respect to the frame 1 and cause the arm 17 of the front shock absorber to rock which, in turn, causes first one piston 13 and next the other piston 14 to move downwardly in cylinders 11 and 12, respectively.

This builds up a pressure, due to the restriction of flow of the resistance medium 21, which pressure is transmitted through either one of the branches 102 or 103 according to which piston is moving downwardly and thence through the conduit 101 and into the chamber 93. From here the surge of increased pressure passes through the passageway 98 past the check valve 99 and into the piston cylinder above the piston 90 to cause the downward movement thereof. The more violent or rapid the oscillation or vibration of the front axle, the greater is the pressure built up in the chamber 93. Downward movement of the piston rod 60 swings the lever 57 in a counterclockwise direction about the axis of its pivotal support on lever 43, which by virtue of the pawl 65 is held in fixed relation to the lug 42 and the frame 1. This counterclockwise movement of the lever 57 causes a downward pull on the connecting link 61 to rock the bell crank lever 37 and to move the valves 33 and 34 toward their closed position thus establishing a greater resistance to movement of the pistons 28 and 29 in their cylinders 26 and 27. Thus, in effect, the shock absorber 25 is prepared in advance for the shocks to which it will be subjected as soon as the rear wheels of the vehicle reach the point in the road or pavement just encountered by the front wheels. In this way, the greater the reaction developed in the front shock absorber 10 the greater will be the pressure transmitted through conduit 101 into the chamber 93 and against the upper side of the piston 90 which, in turn, causes a greater movement of the lever 57 and hence a greater closing movement of the valves 33 and 34. In other words, the greater the shocks imposed upon the front shock absorber 10 the greater will be the resistance the rear shock absorber 25 is capable of producing, by virtue of the adjustment of the valves 33 and 34 toward greater restriction. A leakage groove 106a is associated with each of the check balls 106. These grooves are dimensioned to permit a relatively rapid readjustment of the fluid in cylinders 11 and 12, but their resistance is adequate to build up a pressure in the line 101 and the cylinder 93 sufficient to adjust the valves 33 and 34 in accordance with road conditions.

When the front shock absorber is no longer subjected to oscillations of the axle 6 relative to the frame 1 the pressure in the chamber 93 will be relieved and piston 90 is gradually returned towards its normal or upper position by the spring 92. This gradual return is made so on account of the closing of the check valve in the passageway 98 and the slow return of the fluid above the piston 90 through the restricted passageway 95 into the chamber 93 and from the chamber 93 by leakage back through the leakage ports 22a and 106a into the upper part of the front shock absorber 10. Inasmuch as in many of the vehicles, such as trucks, buses, and the like, the power plant and operator are carried at the front end over or near the front wheels while the variable load is usually carried mainly over the rear wheels, the front wheels can be considered as carrying a substantially constant load while the rear wheels carry a variable load. The response of the front shock absorbers is therefore more nearly proportional to the single factor of road condition. The oscillation of front end of the vehicle can, therefore, be utilized for adjusting the rear shock absorbers.

The structure just described has perhaps its greatest and most advantageous application to passenger vehicles, such as automobiles, buses and the like, and four wheel trucks or similar vehicles, where there is more disadvantage experienced or a greater tendency for the rear end of the vehicle to oscillate vertically when passing over a rough pavement or the like. Where the vehicle to which the shock absorber system is to be applied includes more than four supporting wheels, say six or eight, it may be desirable to apply the automatic adjustment means, both for static and dynamic loads, to more than one shock absorber or more than one oppositely arranged pair of shock absorbers which shock absorber 25 may be said to represent.

In this case it is a relatively simple matter to connect to the bottom of cylinders 26 and 27 a fluid conduit similar to the conduit 101 and in the same manner that the conduit 101 is connected to be responsive to the pressure developed in the cylinders 11 and 12 of the front shock absorber 10. Such a construction is illustrated in Figure 11 in which a pressure conduit 102 is connected to the bottom of the cylinders 26 and 27 and is arranged to extend rearwardly and be associated with a rearward shock absorber 25a of the type indicated by the reference numeral 25 in Figure 1, and disposed, for example, on a trailer or the like (see Figure 9) and operatively connected with the axle 6a thereof, and this shock absorber would have its pressure cylinders also connected by a similar pressure conduit 102a to a shock absorber still further in the rear. This arrangement, of course, may be continued for any number of wheels and would thereby provide an automatic means for adjusting each of them in succession just before each encounters the condition causing the reaction to be developed in the shock absorber just forward thereof.

Under certain conditions it may be desirable to independently adjust or control one or all of the shock absorbers on one or both sides of the vehicle for oncoming stresses just as the rear shock absorber 25 is adjusted in Figure 1 according to the stresses or reaction developed in the front shock absorber 10, under both static and dynamic loads. To illustrate this feature of our invention we mount on the forward portion of the frame 1 a single cylinder 110, see Figures 7 and 11. One means for mounting the cylinder 110 may be the usual bumper supporting arm 111 securely fastened to the frame 1. Movably mounted in the cylinder 110 is a piston 112 having connected thereto a piston rod 113 extending downwardly and out of the cylinder 110 where at its lower end a gauge wheel 115 is journaled for free rotation. This gauge wheel 115 is mounted to follow the inequalities of the road or pavement over which the vehicle is to traverse, and for this purpose a spring 116 may be provided for the purpose of urging the wheel 115 onwardly to cause the same to enter any depressions which may exist in the road or pavement. A pressure conduit 101a, corresponding to the pressure conduit 101 of Figure 1, is provided with a pair of branches 118 and 119, each having a check valved connection 121 and 122, respectively, with the upper and lower ends of the cylinder 110. The pressure conduit 101a is in communication with the cylinder 91 shown in Figure 1 and serves therefore as a means for adjusting the rear shock absorber 25 in the same manner as it was adjusted by the pressure developed in the front shock absorber 10 as shown in Figure 1. The check valves 121 and 122 each have leakage grooves 121a and 122a or equivalent means similar to and for the same purpose as the leakage grooves 106a, as shown in Figure 12. Movement of the piston 112 in an upward direction forces some of the liquid out past the check valve 121 and into the line 101a to increase the pressure therein, the lower check valve 122 preventing any rapid or substantial liquid flow into the cylinder 110 underneath the piston 112. Likewise, downward movement of the piston forces liquid out past the check valve 122 to increase the pressure in the line 101a, since in a given period of time more liquid flows through the check valve 122 than can flow into the cylinder through the leakage port 122a. The leakage ports 121a and 122a, of course, allow for restricted flow to permit the pressures to balance after a given time interval.

While we have thus shown an independent adjusting and controlling means associated with the front shock absorber, it is to be understood that any one or all of the shock absorbers of a vehicle may be provided with such means. The structure of Figure 7 is particularly advantageous in that a gauge wheel 115 and associated structure may be mounted just forward of each of the supporting wheels of the vehicle, in which case each supporting wheel would have associated therewith a shock absorber arrangement practically identical with the rear shock absorber structure 25.

Instead, however, of actuating the piston 112 in the cylinder 110 by the separate gauge wheel 115 we also contemplate actuating it from the front axle of the vehicle. This construction is illustrated in Figures 13 and 14. If only one cylinder is used the piston would preferably be connected with the center of the axle as shown in Figure 13, but two of such cylinders may be used, one to control each side, in which case they could be connected near the ends of the front axle as shown in Figure 14, the pressure conduit 101a in both cases leading to the rear shock absorbers in a manner similar to that shown in Figure 11. It is to be understood that we use the term "front" in the sense that the axle is forward or in advance of the shock absorber controlled thereby. The axle may, therefore, be situated at a point spaced from the usual front axle of the vehicle, particularly where the vehicle employs more than two axles.

It is also to be understood that, while we have shown means actuated by the doors of the automobile, by way of example, for automatically effecting an adjustment of the shock absorber system in accordance with the static load, our invention also contemplates the provision of manually operated means, for example, a member on the dash calibrated in terms of the number of passengers and actuated by the operator of the vehicle, for setting the valves 33 and 34. Such calibrated member may conveniently be connected to the lever 43 and when latched or otherwise secured in adjusted position would function similarly to and replace the means for operating this part described above. In Figure 15 such a calibrated member is indicated by the reference numeral 130 and may comprise a knob or other operating member carried upon the dash or instrument board 131 of the vehicle and connected to directly control the levers 43a (see Figure 16), which correspond with the lever 43 shown in Figure 2, through links 72a similar to those indicated in Figure 1 by the reference numeral 72. The forward ends of the links or rods 72a are connected to arms 134 or the equivalent carried on a rock shaft 135, the latter having an arm 136 connected through a link 137 with an arm 138 or the equivalent positioned by the manual control member 130. The latter is adapted to be held in any one of a number of adjusted positions by any form of latching means or the equivalent as pointed out above. Obviously, the linkage illustrated in Figures 15 and 16 is only one of the many possible means, mechanical or otherwise, for manually controlling the shock absorber system.

It is to be noted that, considering the fact that the doors 3 represent parts which are usually operated during the loading and unloading of the vehicle, the means associated therewith for setting the shock absorbers in accordance with the static load functions automatically; but in the sense that the operator may at any time open one or more of the doors, the structure we have shown in the drawings is to be considered also means capable of manual operation for setting or adjusting the shock absorbers.

While we have shown and described the preferred structural embodiment of our present invention, it is to be understood that our invention is not to be limited to the specific structure described and illustrated, but that, in fact, widely different means may be employed in the practice of the broader aspects of our present invention.

What we claim, therefore, and desire to secure by Letters Patent is:

1. A shock absorber for vehicles comprising means having a part carried by said vehicle and establishing a variable resistance to relative motion between the vehicle body and the axle, and means disposed forward of the first mentioned means for controlling said resistance in accordance with the dynamic load, said last mentioned means including a movable member responsive to vertical vibration of a portion of the vehicle body in advance of said first mentioned means.

2. In a hydraulic shock absorber system for the spring suspension of vehicles, the combination of means adapted to variably resist relative motion between the vehicle body and the axle, means to control the spring reaction in accordance with the static load on the vehicle, and means to control the spring reaction in accordance with the condition of the road in advance of the position of said axle when the vehicle is moving.

3. In a shock absorber system for automobiles, a shock absorber associated with one of the supporting wheels, said shock absorber including an adjustable resistance element, and means mounted forward of the supporting wheel and responsive to road inequalities in advance of said wheel for adjusting the effective amount of resistance offered by said element.

4. In a shock absorber system for automobiles, a shock absorber associated with certain of the supporting wheels, each of said shock absorbers including an adjustable resistance element, and means mounted forward of each of said certain supporting wheels in a position to be responsive to the road inequalities in advance thereof to adjust the resistance element of the shock absorber associated with that wheel for said inequalities before they are encountered by said wheel.

5. In a spring supported vehicle, shock absorber mechanism including a cylinder, a piston therein, a resistance medium in said cylinder, means providing an adjustable restricted passage for said medium, means for adjusting said passage for increasing or decreasing the resistance offered to said medium in accordance with the static load on said vehicle, and mechanism operable at will for rendering said adjusting means inoperative.

6. In a spring supported vehicle, shock absorber mechanism including a cylinder, a piston therein, a resistance medium in said cylinder, means providing an adjustable restricted passage for said medium, means for adjusting said passage for increasing or decreasing the resistance offered to said medium in accordance with the static load on said vehicle, and mechanism operable when the vehicle is ready for travel for rendering said adjusting means inoperative.

7. In a vehicle, in combination, a shock absorber including relatively movable parts connected with the body and axle of the vehicle and means establishing a variable resistance in opposition to the relative movements of said parts, means including a pivoted lever for adjusting said variable resistance, means providing a pair of movable fulcrums for said lever, each of said movable fulcrums being connected to be individually and collectively responsive to variations in loads to which said shock absorber is subjected.

8. A fluid check shock absorber for controlling movements of relatively movable parts and including a piston and cylinder structure and a valved passage offering resistance to movement of the piston in the cylinder, means on one of said parts for adjusting said valved passage so that the resistance established will be proportional to one condition of loading of said parts, and means for modifying said adjustment in accordance with another condition of loading.

9. The combination with a vehicle of a retarding device connected with the body and axle thereof, said device including a movable member for varying the resistance of said retarding device, linkage operatively connected to the movable member for setting the adjustment of said resistance, means providing a pair of spaced movable fulcrums for said linkage, means for moving one of said fulcrums in accordance with the static load, and means for moving the other fulcrum in accordance with the road conditions to which the retarding device will be subjected.

10. The combination with a vehicle having a spring suspension, of a retarding device connected with the body and axle of the vehicle for damping relative movement therebetween, said device including a fluid resistance medium and a valved restriction adjustable to vary the degree of retarding effect, link means for controlling said valved restriction and including a pivoted lever, means operable to position one end of the lever in accordance with the static load imposed on the spring suspension, said means including a pivoted member mounted on the body and adapted to be positioned according to the yielding of the spring suspension under static load, a pressure responsive element movably mounted on the body and also connected to said pivoted lever to position another portion of the lever in accordance with the pressure imposed on said pressure responsive element, and means to control said pressure in accordance with the dynamic load to which said spring suspension is subjected during travel of the vehicle.

11. The combination with a vehicle having a spring suspension, of a retarding device connected with the body and axle of the vehicle for damping relative movement therebetween, said device including a variable resistance adjustable to vary the degree of retarding effect, link means for controlling said variable resistance including a dually controlled movable member, means for establishing one control for said member, comprising a pivoted segment connected to said member, yielding means causing the segment to move proportionately to the flexing of the spring suspension under static load, latch means cooperating with said segment to secure it in adjusted position when the application of static load is completed, and means for establishing the other control for said member, comprising means movable in response to the variation of the dynamic load to which said spring suspension is subjected when the vehicle is in motion.

12. The combination with a vehicle having front and rear spring suspension, shock absorbers associated with the front and rear thereof and means actuated by the operation of the front shock absorber in damping vibration of the vehicle body for varying the resistance to vibration established by the rear shock absorber whereby the latter is adjusted to meet the conditions imposed upon the front shock absorber.

13. The combination with a vehicle having front and rear spring suspension, hydraulic shock absorbers associated with the front and rear thereof, and means actuated by an increase in pressure due to the operation of the front shock absorber in damping vibration of the vehicle body for increasing the resistance to vibration established by the rear shock absorber whereby the latter is adjusted to meet the conditions imposed upon the front shock absorber.

14. The combination with a vehicle having front and rear spring suspension, two-way hydraulic shock absorbers associated with the front and rear of said vehicle, each shock absorber including means creating a flow of fluid whenever the vehicle body experiences an upward or a downward movement from a normal position and means establishing a resistance to such flow, means to vary the resistance in the rear shock absorber, and operating means therefor including a piston and cylinder structure and means subjecting the same to the pressure in the front shock absorber.

15. The combination with a vehicle having front and rear spring suspension, two-way hydraulic shock absorbers associated with the front and rear of said vehicle, each shock absorber including means creating a flow of fluid whenever the vehicle body experiences an upward or a downward movement from a normal position and means establishing a resistance to such flow, means to adjust said resistance in accordance with the static load on the vehicle, and independent means also operable to adjust said resistance, said independent means including a pressure responsive element and a fluid pressure chamber in communication with the front shock absorber and adapted to communicate a pressure increase therein resulting from vibration of the body to the rear shock absorber to adjust the resistance thereof in accordance with the intensity and frequency of the vibration of the front of the vehicle.

16. In a shock absorber system including a plurality of shock absorbers serially subjected in succession to an impressed force, the method which comprises varying the resistance to be established by one of the shock absorbers later in the succession in proportion to the reaction developed in one of the shock absorbers earlier in the succession.

17. In a hydraulic shock absorber system for the spring suspension of vehicles, the combination of means adapted to variably resist relative motion between the vehicle body and the axle, means responsive to the static load on the vehicle to adjust said variable resistance, and manually operated mechanism for controlling said adjusting means.

18. In a shock absorber system for vehicles, a shock absorber comprising a member connected with a vehicle body, a second member connected with the axle and movable relatively to the first member, means adapted to create a flow of fluid in a closed circuit upon the occurrence of relative movement between said members, an adjustable resistance interposed in said closed circuit and adapted to oppose such relative movement, and means responsive to the load on the vehicle and connected with said adjustable resistance for adjusting the latter in accordance with changes in the vehicle load.

19. In a shock absorber system for automobiles, a shock absorber associated with one of the supporting wheels, said shock absorber including an adjustable resistance element, and means including a movably mounted road contacting element mounted forward of the supporting wheel and responsive to road inequalities for adjusting the effective amount of resistance offered by said element.

20. In a spring supported vehicle, shock absorber mechanism including a cylinder, a piston therein, a resistance medium in said cylinder, means providing an adjustable restricted passage for said medium, said means comprising a shiftable valve, and means for shifting the valve comprising a fixed cylinder and a piston therein vibratable in accordance with road conditions, said valve being shifted by changes in the pressure in said fixed cylinder.

21. In a spring supported vehicle, shock absorber mechanism including a cylinder, a piston therein, a resistance medium in said cylinder, means providing an adjustable restricted passage for said medium, said means comprising a shiftable valve, pressure operated means for shifting said valve, and mechanism for controlling said last mentioned means, said mechanism comprising a fixed cylinder, a piston therein vibratable in accordance with road conditions, and means communicating the pressure in said cylinder to said pressure operated means.

22. In a spring supported vehicle having front and rear spring suspension means, the combination of rear shock absorber mechanism including adjustable means for varying the resistance established by said rear shock absorber mechanism, and means responsive to the vibration of the front spring suspension for controlling said adjusting means.

23. In a shock absorber system including a plurality of at least two shock absorbers arranged in series and subjected in succession to an impressed force, the method which comprises varying the resistance to be established by the shock absorber later in the succession in proportion to the reaction developed in the shock absorber earlier in the succession.

24. In a shock absorber system for damping relative movement between two parts and including a shock absorber mechanism having adjustable means for varying the resistance established by said mechanism, the method of controlling said shock absorber mechanism which comprises adjusting said means in accordance with the vibration imparted to said relatively movable parts in advance of said mechanism.

25. In combination, a shock absorbing system on a vehicle one or more of the wheels of which carry an approximately constant load and the remaining wheels a variable load, and means determined by the shock imposed on the constantly loaded wheels to adjust the shock absorbing system on the variable loaded wheels.

26. In combination, a shock absorbing system on a vehicle one or more of the wheels of which carry an approximately constant load and the remaining wheels a variable load, and automatic means determined by the character of shock imposed on the constantly loaded wheels to control the shock absorbing system on the variable loaded wheels while the vehicle is in motion.

27. In combination, a shock absorbing system on a vehicle one or more of the wheels of which carry an approximately constant load and the remaining wheels a variable load, said system comprising shock absorbing means for the constantly loaded wheels and adjustable shock absorbing means for said variably loaded wheels, means responsive to the static load on said latter for adjusting said adjustable shock absorbing means, and means determined by the shock imposed on the shock absorbing system for the constantly loaded wheels to adjust the shock absorbing system for the variable loaded wheels.

28. In combination, a shock absorbing system on a vehicle one or more of the wheels of which carry an approximately constant load and the remaining wheels a variable load; said system including adjustable shock absorbing means for said variably loaded wheels, means responsive to the static load on the latter for adjusting said shock absorbing means, and means determined by the shock imposed on the constantly loaded wheels to adjust the shock absorbing system for the variable loaded wheels.

29. In a vehicle, in combination, a hydraulic shock absorber system including resistance medium and a plurality of restricted passages therefor, a plurality of valves controlling said restricted passages, a single means actuable by the operator of the vehicle for simultaneously adjusting all of said valves, and means responsive to road inequalities for imposing an additional adjustment on said valves.

30. In a vehicle, in combination, a hydraulic shock absorber system including a plurality of cylinders, a plurality of pistons movable therein, a liquid resistance medium in each cylinder, means establishing an adjustable restricted passage for the resistance medium of each cylinder, means actuable by the operator of the vehicle for simultaneously adjusting all of said adjustable restricted passages, and means for automatically adjusting said restricted passages in accordance with the conditions to which that portion of the shock absorber system will be subjected.

HERBERT E. BUCKLEN.
JOSEPH N. MAHONEY.